(12) United States Patent
Rosen (10) Patent No.: US 8,761,324 B1
(45) Date of Patent: Jun. 24, 2014

(54) METHOD AND APPARATUS FOR PHASE SIGNALING

(75) Inventor: Eitan Rosen, Abirim (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 575 days.

(21) Appl. No.: 12/779,462

(22) Filed: May 13, 2010

Related U.S. Application Data (60) Provisional application No. 61/224,767, filed on Jul. 10, 2009.

(51) Int. Cl.
*H04L 7/00* (2006.01)

(52) U.S. Cl.
USPC .......................................... 375/354; 375/220

(58) Field of Classification Search
USPC .......................................... 375/220, 354–376
See application file for complete search history.

(56) References Cited

U.S. PATENT DOCUMENTS

| | | | | |
|---|---|---|---|---|
| 4,308,615 A | * | 12/1981 | Koegel et al. | 714/46 |
| 6,072,810 A | * | 6/2000 | Van der Putten et al. | 375/371 |
| 6,088,829 A | * | 7/2000 | Umemura et al. | 714/798 |
| 6,240,151 B1 | * | 5/2001 | Ko | 375/370 |
| 7,295,578 B1 | * | 11/2007 | Lyle et al. | 370/503 |
| 7,626,972 B2 | * | 12/2009 | Garani | 370/347 |
| 2005/0054357 A1 | * | 3/2005 | Takiishi et al. | 455/502 |
| 2007/0257714 A1 | * | 11/2007 | Cheung | 327/117 |
| 2007/0280344 A1 | * | 12/2007 | Ha | 375/238 |
| 2008/0258806 A1 | * | 10/2008 | Youssoufian et al. | 327/553 |

OTHER PUBLICATIONS

Circuit and Signaling Techniques for On-Chip Interconnects, Department of Electrical and Computer Engineering—University of Massachusetts Amherst, Atul Maheshwari, Sep. 2004.

* cited by examiner

*Primary Examiner* — Sam K Ahn
*Assistant Examiner* — Janice Tieu (57) ABSTRACT

Aspects of the disclosure provide methods and apparatuses that use counter based phase signaling to transmit digital data. The counter based phase signaling uses a reduced number of transitions to transmit a large number of bits. A method of counter based phase signaling includes transmitting a reference transition to start multiple-bit data block transmissions from a transmitter module to a receiver module, starting a first counter to count in accordance with a first clock of the transmitter module, and transmitting a first data transition corresponding to transmitting a first multiple-bit data block from the transmitter module to the receiver module when a counted number by the first counter corresponds to the first multiple-bit data block. The first clock has a same frequency as a second clock in the receiver module.

18 Claims, 7 Drawing Sheets

METHOD AND APPARATUS FOR PHASE SIGNALING

INCORPORATION BY REFERENCE

This application claims the benefit of U.S. Provisional Application No. 61/224,767, "Counter Based Phased Signaling" filed on Jul. 10, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various techniques are used for transmitting information. For example, modulation techniques, such as amplitude modulation, phase modulation, frequency modulation, and the like, are suitably used in communication systems to transmit information. From another aspect, a communication system can suitably use parallel transmission or serial transmission to suit its needs. In an example, a communication device transmits information internally in a parallel format, and transmits information externally in a serial format. The communication device can include a serializer/deserializer (SerDes) that converts data format between the parallel format and the serial format.

SUMMARY

Aspects of the disclosure can provide methods and apparatuses that use counter based phase signaling to transmit digital data. The counter based phase signaling uses a reduced number of transitions to transmit a large number of bits. Further, in an embodiment, the counter based phase signaling is be implemented with a small circuit footprint and small power consumption. Thus, the counter based phase signaling can be used to replace, for example, a serializer/deserializer (SerDes) in a system to reduce circuit footprint and power consumption.

Aspects of the disclosure provide a method for transmitting digital data blocks using counter based phase signaling. The method includes transmitting a reference transition to start multiple-bit data block transmissions from a transmitter module to a receiver module, starting a first counter to count in accordance with a first clock of the transmitter module, and transmitting a first data transition corresponding to transmitting a first multiple-bit data block from the transmitter module to the receiver module when a counted number by the first counter corresponds to the first multiple-bit data block. The first clock has a same frequency as a second clock in the receiver module.

To start the first counter to count in accordance with the first clock of the transmitter module, the method includes initializing the first counter to the first multiple-bit data block, and starting the first counter to count in accordance with the first clock of the transmitter module.

Accordingly, to transmit the first data transition, the method includes transmitting the first data transition corresponding to transmitting the first multiple-bit data block when the first counter down-counts to zero.

In an embodiment, the first clock is a high frequency clock. The method includes generating the first clock of the transmitter module by frequency-multiplying a system clock of the transmitter module.

In addition, in an embodiment, the method transmits several multiple-bit data blocks in parallel with regard to the reference transition. In an example, the method further includes starting a second counter to count in accordance with the first clock of the transmitter module, and transmitting a second data transition corresponding to transmitting a second multiple-bit data block from the transmitter module to the receiver module when a counted number by the second counter corresponds to the second multiple-bit data block.

Aspects of the disclosure also provide a method for receiving digital data blocks that are transmitted using counter based phase signaling. The method includes receiving a reference transition by a receiver module to start receptions of multiple-bit data blocks transmitted from a transmitter module, starting a first counter to count in accordance with a first clock of the receiver module when the reference transition is received, receiving a first data transition, and stopping the first counter in response to the received first data transition. The first clock of the receiver module has a same frequency as a second clock in the transmitter module. The first data transition corresponds to a first multiple-bit data block transmitted from the transmitter module to the receiver module.

To start the first counter, the method includes initializing the first counter to zero, and starting the first counter to count in accordance with the first clock of the receiver module when the reference transition is received. Further, the method includes sampling the first counter to obtain the first multiple-bit data block at a time that allows for transmitting a largest multiple-bit data block.

When several multiple-bit data blocks are transmitted in parallel, the method further includes starting a second counter to count in accordance with the first clock of the receiver module when the reference transition is received, receiving a second data transition in, and stopping the second counter in response to the received second data transition.

Aspects of the disclosure provide an apparatus that transmits multiple-bit data blocks using counter based phase signaling. The apparatus includes a reference transmitting module configured to transmit a reference transition to start multiple-bit data block transmissions to a receiving apparatus, a first counter configured to start counting in accordance with a first clock of the apparatus when the reference transition is transmitted, and a first data transmitting module configured to transmit a first data transition corresponding to transmitting a first multiple-bit data block to the receiving apparatus when a counted number by the first counter corresponds to the first multiple-bit data block. The first clock of the apparatus has a same frequency as a second clock in the receiving apparatus.

In an embodiment, the first counter is initialized to the first multiple-bit data block and the first data transmitting module is configured to transmit the first data transition when the first counter down-counts to zero.

In a parallel transmission example, the apparatus further includes a second counter configured to start counting in accordance to the first clock of the apparatus, and a second data transmitting module configured to transmit a second data transition corresponding to transmitting a second multiple-bit data block to the receiving apparatus when a counted number by the second counter corresponds to the second multiple-bit data block.

Aspects of the disclosure can provide an apparatus that receives multiple-bit data blocks transmitted by counter based phase signaling. The apparatus includes a reference receiving module configured to receive a reference transition to start receptions of multiple-bit data blocks transmitted from a transmitting apparatus, a first data receiving module configured to receive a first data transition corresponding to a first multiple-bit data block transmitted from the transmitting apparatus, and a first counter configured to start counting in accordance with a first clock of the apparatus when the reference receiving module receives the reference transition and stop counting when the first data receiving module receives the first data transition. The first clock of the apparatus has a same frequency as a second clock in the transmitting apparatus.

In an embodiment, the first counter is initialized to zero, and is configured to count in accordance with the first clock of the apparatus when the reference receiving module receives the reference transition.

Further, the apparatus includes an output module configured to sample the first counter to obtain the first multiple-bit data block at a time that allows for transmitting a largest multiple-bit data block.

In a parallel transmission example, the apparatus includes a second data receiving module configured to receive a second data transition corresponding to a second multiple-bit data block transmitted from the transmitting apparatus, and a second counter configured to start counting in accordance with the first clock of the apparatus when the reference receiving module receives the reference transition and stop counting when the second data receiving module receives the second data transition.

Aspects of the disclosure can provide an integrated circuit (IC). The IC includes a transmitter module configured to transmit multiple-bit data blocks based on a transmitter clock, and a receiver module configured to receive the multiple-bit data blocks based on a receiver clock. The transmitter clock and the receiver clock have a same frequency.

The transmitter module further includes a reference transmitting module configured to transmit a reference transition to start multiple-bit data block transmissions to the receiver module, a first transmitting counter configured to start counting in accordance with the transmitter clock when the reference transition is transmitted, and a first data transmitting module configured to transmit a first data transition corresponding to transmitting a first multiple-bit data block to the receiver module when a counted number by the first transmitting counter corresponds to the first multiple-bit data block.

The receiver module further includes a reference receiving module configured to receive the reference transition to start receptions of multiple-bit data blocks transmitted from the transmitter module, a first data receiving module configured to receive the first data transition corresponding to the first multiple-bit data block transmitted from the transmitter module, and a first receiving counter configured to start counting in accordance with the receiver clock when the reference receiving module receives the reference transition and stop counting when the first data receiving module receives the first data transition.

In a parallel transmission example, the transmitter module further includes a second transmitting counter configured to start counting in accordance to the transmitter clock when the reference transition is transmitted, and a second data transmitting module configured to transmit a second data transition corresponding to transmitting a second multiple-bit data block to the receiver module when a counted number by the second transmitting counter corresponds to the second multiple-bit data block. The receiver module further includes a second data receiving module configured to receive the second data transition corresponding to the second multiple-bit data block transmitted from the transmitter module, and a second receiving counter configured to start counting in accordance with the receiver clock when the reference receiving module receives the reference transition and stop counting when the second data receiving module receives the second data transition.

In an embodiment, the transmitter module further includes a sample transmitting counter configured to start counting in accordance to the transmitter clock when the reference transition is transmitted, and a sample transmitting module configured to transmit a sample transition when a counted number by the sample transmitting counter is larger than a largest multiple-bit data block. Accordingly, the receiver module includes a sample receiving module configured to receive the sample transition, and an output module configured to sample the first receiving counter to obtain the first multiple-bit data block when the sample transition is received.

Alternatively, the receiver module includes a sample receiving counter configured to start counting in accordance with the receiver clock when the reference receiving module receives the reference transition. The output module is configured to sample the first receiving counter to obtain the first multiple-bit data block when the sample receiving counter counts a number larger than a largest multiple-bit data block.

In an example, the first transmitting counter and the first receiving counter are implemented as ripple counters. It is noted that power consumption of a ripple counter is substantially equal to power consumption of two flip-flops. In an embodiment, the transmitter module and the receiver module are within a same IC chip. In another embodiment, the transmitter module and the receiver module are within different chips.

In an embodiment, the reference transition is transmitted by a reference link, and the first data transition is transmitted by a first data link. Similarly, the second data transition is transmitted by a second data link, and the sample transition is transmitted by a sample link. In another embodiment, the reference transition and the first data transition are transmitted by a same link. In another embodiment, the reference transition is suitably transmitted with a clock.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
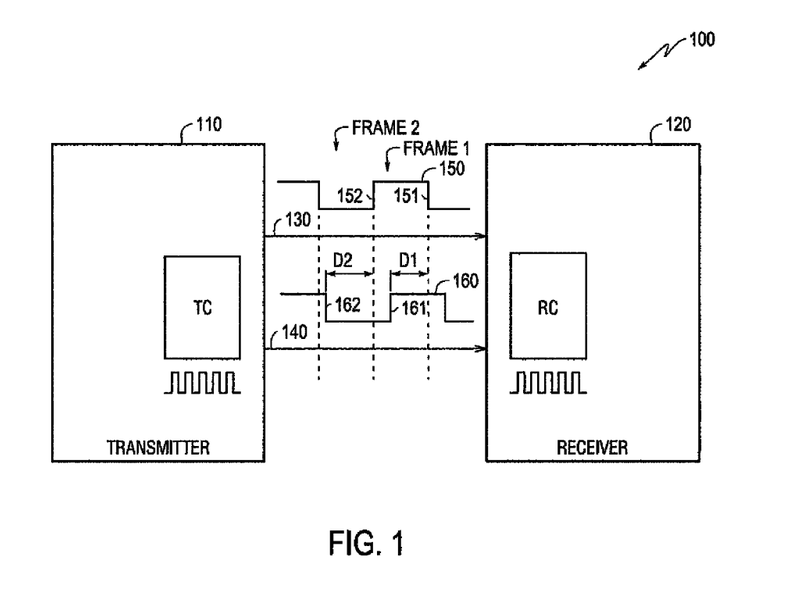
FIG. 1 shows a block diagram of a communication system example according to an embodiment of the disclosure.

FIG. 1 shows a block diagram of a communication system example 100 according to an embodiment of the disclosure. The communication system 100 includes a transmitter module 110 and a receiver module 120. The transmitter module 110 and the receiver module 120 are coupled together by one or more links, such as a reference link 130 and a data link 140, as seen in FIG. 1.

In an embodiment, the transmitter module 110 and the receiver module 120 are within a same chip. The reference link 130 and the data link 140 include any suitable interconnections within the chip, such as wire connections, via connections, and the like. Link delays of the reference link 130 and the data link 140 are substantially the same or can be compensated to be substantially the same. For ease and clarity, the reference link 130 and the data link 140 are considered to have the same delay.

In another embodiment, the transmitter module 110 and the receiver module 120 are in two different chips, or even two different devices coupled by one or more communication links, such as Ethernet links, wireless links, and the like. The reference link 130 and the data link 140 include any suitable connections, such as printed circuit board (PCB) wires, pad connections, and the like, between the two chips. Similarly, for ease and clarity, the reference link 130 and the data link 140 are considered to have the same delay.

The transmitter module 110 transmits a multiple-bit data block in a data frame by a reference transition and a data transition. More specifically, the transmitter module 110 transmits a reference signal 150 over the reference link 130, and a data signal 160 over the data link 140. The reference signal 150 includes reference transitions corresponding to starts of multiple-bit data block transmissions. In each data frame, the reference signal 150 has one reference transition. For example, in Frame 1, the reference signal 150 has a reference transition 151, and in Frame 2, the reference signal 150 has a reference transition 152. Similarly, in each data frame, the data signal 160 has a data transition. For example, in Frame 1, the data signal 160 has a data transition 161, and in Frame 2, the data signal 160 has a data transition 162. Each data transition corresponds to a multiple-bit data block transmission. The number of bits in the multiple-bit data block can be predetermined. In an example, the transmitter module 110 transmits a 4-bit data block in each data frame. Thus, to transmit an 8-bit binary number, the 8 bits are grouped into a first 4-bit data block D1 and a second 4-bit data block D2 for transmission. The transmitter module 110 transmits the first 4-bit data block D1 in Frame 1 by the data transition 161, and transmits the second 4-bit data block D2 in Frame 2 by the data transition 162.

The data transitions 161-162 in the data signal 160 are transmitted with regard to the reference transitions 151-152 in the reference signal 150. More specifically, the time differences (phase differences) between the data transitions 161-162 and the corresponding reference transitions 151-152 correspond to the transmitted multiple-bit data blocks. For example, the time difference between the data transition 161 and reference transition 151 corresponds to the first 4-bit data block D1, and the time difference between the data transition 162 and the reference transition 152 corresponds to the second 4-bit data block D2.

In an embodiment, the transmitter module 110 includes a counter TC to count in accordance with a high frequency clock to determine the time differences between the data transitions and the corresponding reference transitions. In an example, the counter TC is configured as a down-counter. The counter TC is initialized to the first 4-bit data block D1 in Frame 1. When the transmitter module 110 transmits the reference transition 151, the counter TC starts to down-count by one every clock cycle of the high frequency clock. When the counter TC down-counts to zero, the transmitter module 110 transmits the data transition 161. Similarly, the counter TC is initialized to the second 4-bit data block D2 in Frame 2. When the transmitter module 110 transmits the reference transition 152, the counter TC starts to down-count by one every clock cycle of the high frequency clock. When the counter TC down-counts to zero, the transmitter module 110 transmits the data transition 162. It is noted that the transmitter module 110 can be suitably adjusted to use an up-counter TC.

It is also noted that the receiver module 120 also has a high frequency clock. The high frequency clock of the receiver module 120 has the same clock frequency as the high frequency clock of the transmitter module 110. In an embodiment, the transmitter module 110 and the receiver module 120 operates under a same system clock. The transmitter module 110 and the receiver module 120 can respectively include clock generators to generate the high frequency clocks. In an example, each of the transmitter module 110 and the receiver module 120 includes a phase-locked loop (PLL) to frequency-multiply the system clock, for example, by twenty times, to generate the high frequency clock.

In another embodiment, the transmitter module 110 and the receiver module 120 are within different devices. The different devices can use any suitable technique to lock their system clocks to have the same frequency. Then, the transmitter module 110 and the receiver module 120 can respectively generate their high frequency clocks based on their respective system clocks. Thus, the high frequency clock used by the transmitter module 110 and the high frequency clock used by the receiver module 120 can have the same frequency. It is noted that the phases of the high frequency may be not aligned. In an embodiment, the receiver module 120 includes suitable circuit to align the high frequency clock in the receiver module 120 with the high frequency clock in the transmitter module 110 based on the received signals.

The receiver module 120 receives the reference transitions 151-152 in the reference signal 150 from the reference link 130 and receives data transitions 161-162 in the data signal 160 from the data link 140. Further, the receiver module 120 determines the transmitted multiple-bit data blocks based on time differences between the received data transitions 161-162 and the received corresponding reference transitions 151-152. For example, the receiver module 120 determines the first 4-bit data block D1 based on the time difference between the received data transition 161 and the received reference transition 151, and determines the second 4-bit data block D2 based on the time difference between the received data transition 162 and the received reference transition 152.

In an embodiment, the receiver module 120 includes a counter RC to determine the transmitted multiple-bit data blocks in accordance with the high frequency clock. It is noted that the high frequency clock used by the receiver module 120 has the same frequency as the high frequency clock used by the transmitter module 110. In an example, the counter RC is configured as an up-counter. The counter RC is initialized to zero. When the receiver module 120 receives the reference transition 151, the counter RC starts to up-counter by one every clock cycle of the high frequency clock. When the receiver module 120 receives the data transition 161, the counter RC stops and holds its counted number. Thus, the counted number in the counter RC corresponds to the received multiple-bit data block. It is noted that the receiver module 120 can be suitably adjusted to use a down-counter RC.

In an embodiment, the counters TC and RC are implemented as ripple counters to reduce foot-print and power consumption. It is noted that asymptotic power consumption of a ripple counter substantially equals to two flip-flops. It is also noted that any error correction and/or data coding techniques can be suitably applied in the communication system 100.

In another embodiment, the communication system 100 includes multiple data links 140 to transmit multiple data blocks in parallel with regard to a same reference transition in the reference link 130. For example, to transmit N data blocks in parallel, each of N data links transmits a data transition, and the reference link 130 transmits a reference transition. Thus, the communication system 100 uses N+1 transitions to transmit N data blocks, and reduces power consumption as a result of a reduced number of transitions.

It is noted that the reference transitions can be transmitted by any suitable links, such as a dedicated link, or a link for other purpose. In an example, the communication system 100 uses a same link to transmit reference transitions and data transitions. In another example, reference transitions are transmitted with a clock signal.

It is also noted that when no data needs to be transmitted, the reference link 130 is suppressed of transition. The status of the reference link 130 can be suitably detected and used to configure the transmitter module 110 and/or the receiver module 120 into a power save mode, for example, in order to save power.

Figure 2:
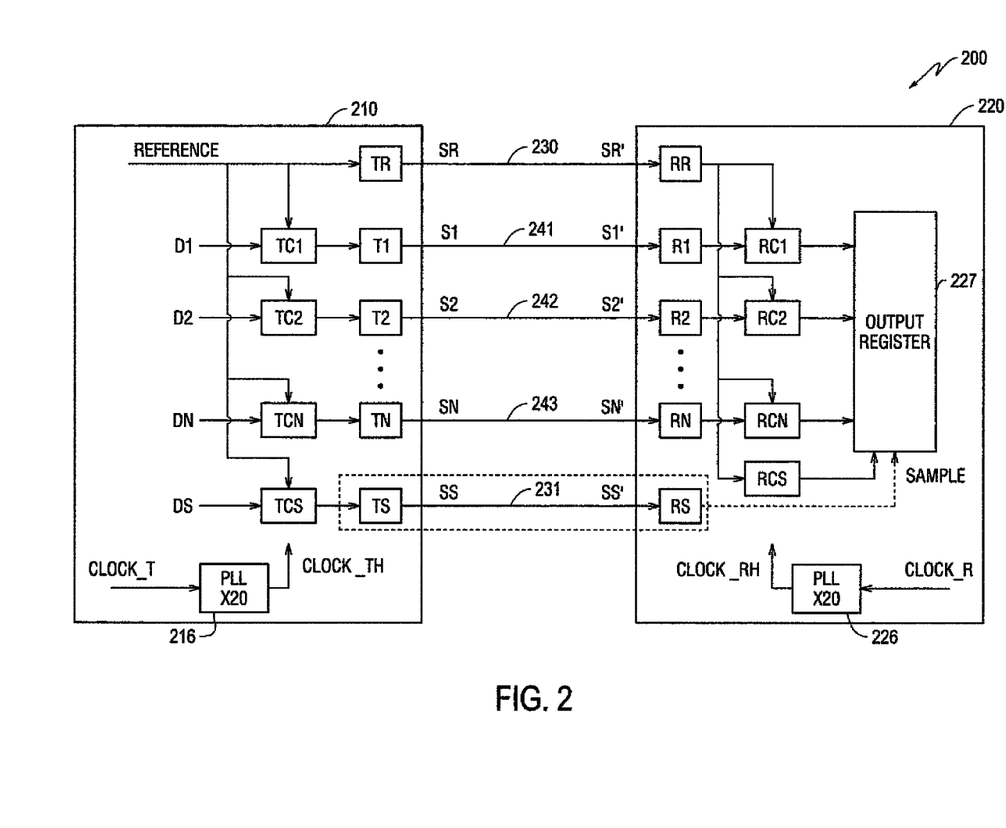
FIG. 2 shows another block diagram of a communication system example according to an embodiment of the disclosure.

FIG. 2 shows another block diagram of a communication system example 200 according to an embodiment of the disclosure. The communication system 200 includes a transmitter module 210 and a receiver module 220. Further, the communication system 200 includes a plurality of links to transmit signals from the transmitter module 210 to the receiver module 220. The plurality of links include a reference link 230 and a plurality of data links 241-243. Additionally, in an embodiment, the plurality of links include a sample link 231.

The transmitter module 210 and the receiver module 220 have high frequency clocks of the same frequency. In an example, the transmitter module 210 includes a PLL module 216 to generate a high frequency clock CLOCK_TH. The PLL module 216 frequency-multiplies a transmitter system clock CLOCK_T by twenty times. Similarly, the receiver module 220 includes a PLL module 226 to generate a high frequency clock CLOCK_RH. The PLL module 226 frequency-multiplies a receiver system clock CLOCK_R by 20 times. The transmitter system clock CLOCK_T and the receiver system clock CLOCK_R can be suitably frequency-locked. Thus, the high frequency clock CLOCK_TH and the high frequency clock CLOCK_RH have the same frequency.

The transmitter module 210 includes a reference transmitting interface unit TR, data transmitting interface units T1-TN, and transmitting counters TC1-TCN. These elements can be coupled together as seen in FIG. 2.

The reference transmitting interface unit TR transmits a reference signal SR over the reference link 230 to the receiver module 220. The receiver module 220 receives a reference signal SR' in response to the transmitted reference signal SR. The reference signal SR includes a reference transition in each data frame to start transmissions of multiple-bit data blocks. In an embodiment, the reference transmitting interface unit TR transmits a reference transition in response to a reference signal REFERENCE. In an example, the reference signal REFERENCE is generated based on the transmitter system clock CLOCK_T.

The data transmitting interface units T1-TN transmit data signals S1-SN over the data links 241-243 to the receiver module 220. The receiver module 220 receives data signals S1'-SN' in response to the transmitted data signals S1-SN. Each of the data signals S1-SN includes a data transition in each data frame for transmitting a multiple-bit data block. The data transition is transmitted with regard to a corresponding reference transition in the data frame. More specifically, the time difference between the data transition and the corresponding reference transition corresponds to the multiple-bit data block.

The transmitting counters TC1-TCN are respectively coupled to the data transmitting interface units T1-TN. Each transmitting counter receives a multiple-bit data block, and determines a time for the coupled data transmitting interface unit to transmit a data transition based on the multiple-bit data block. In an example, the transmitting counter is initialized to the multiple-bit data block, and starts to down-count when the reference signal REFERENCE enables the transmitting counter. The transmitting counter down-counts in accordance to the high frequency clock CLOCK_TH. For example, the transmitting counter down-counts by one every clock cycle of the high frequency clock CLOCK_TH. When the transmitting counter counts to zero, the coupled data transmitting interface unit transmits a data transition.

In an embodiment, the transmitter module 210 includes a sample counter TCS. The sample counter TCS is coupled to the transmitting counters TC1-TCN to provide control signals for stopping and/or reloading the transmitting counters TC1-TCN. The sample counter TCS is initialized to a number that is larger than the largest multiple-bit data block, and starts to down-count when the reference signal REFERENCE enables the sample counter TCS. In an example, the transmitter module 210 transmits data in the form of 4-bit data block. Thus, the sample counter TCS can be initialized to 17 in every data frame. The sample counter TCS down-counts in accordance to the high frequency clock CLOCK_TH. For example, the sample counter TCS down-counts by one every clock cycle of the high frequency clock CLOCK_TH. When the sample counter TCS counts to zero, the sample counter TCS provides control signals to the transmitting counters TC1-TCN to stop them, and load next multiple-bit data blocks for transmission into the transmitting counters TC1-TCN.

Further, in an embodiment, the transmitter module 210 includes a sample transmitting interface unit TS coupled with the sample counter TCS to transmit a sampling signal SS over the sample link 231 to the receiver module 220. The receiver module 220 receives a sampling signal SS' in response to the transmitted sampling signal SS. In an example, when the sample counter TCS counts to zero, the coupled sample transmitting interface unit TS transmits a sample transition.

The receiver module 220 includes a reference receiving interface unit RR, data receiving interface units R1-RN, and receiving counters RC1-RCN. These elements can be coupled together as seen in FIG. 2.

The reference receiving interface unit RR receives the reference signal SR' over the reference link 230 in response to the transmitted reference signal SR. The reference signal SR' includes transitions indicating starts of multiple-bit data block receptions. The reference receiving interface unit RR generates suitable control signals to the receiving counters RC1-RCN in response to the transitions in the reference signal SR'. In an example, the reference receiving interface unit RR generates an enable signal to enable the receiving counters RC1-RCN to start counting.

The data receiving interface units R1-RN receive data signals S1'-SN' over the data links 241-243 in response to the transmitted data signals S1-SN. Each of the data signals S1'-SN' includes a data transition in each data frame indicating an end of a multiple-bit data block reception. The data receiving interface units R1-RN can suitably generate control signals to the receiving counters RC1-RCN in response to the received data transitions. In an example, a data receiving interface unit generates a stop signal to stop the coupled receiving counter.

The receiving counters RC1-RCN are coupled to the reference receiving interface unit RR and are respectively coupled to the data receiving interface units R1-RN. Each receiving counter receives the enable signal from the reference receiving interface unit RR and the stop signal from the coupled data receiving interface unit, and generates a received multiple-bit data block. In an example, the receiving counter is initialized to zero, and starts to up-count when the enable signal enables the receiving counter. The receiving counter up-counts in accordance with the high frequency clock CLOCK_RH. For example, the receiving counter up-counts by one every clock cycle of the high frequency clock CLOCK_RH. The receiving counter stops counting when the coupled data receiving interface unit generates a stop signal in response to a received data transition. The receiving counter can hold the counted number and wait for sampling.

In an embodiment, the receiver module 220 includes an output module 227. The output module 227 samples the receiving counters RC1-RCN to obtain the transmitted multiple-bit data blocks. In an example, the receiver module 220 includes a sample receiving interface unit RS to receive the sampling signal SS' from the sample link 231. The sampling signal SS' includes sample transitions. The sample receiving interface unit RS generates a sample signal in response to a received sample transition to control the output module 227 to sample the receiving counters RC1-RCN.

Alternatively, the receiver module 220 can include a sample counter RCS to generate the sample signal. For example, the sample counter RCS is initialized to zero, and starts to count when it has been enabled by the enable signal from reference receiving interface unit RR, and generates the sample signal when the counted number is 17. The sample signal is provided to the output module 227 to sample the receiving counters RC1-RCN. In addition, in an example, the sample signal is suitably used to reset the receiving counters RC1-RCN to zero after sampling, for example.

In an embodiment, the transmitting counters TC1-TCN and the receiving counters RC1-RCN are implemented as ripple counters to reduce foot-print and power consumption. In addition, the transmitter module 210 and the receiver module 220 include any suitable logics to support the implementation.

Figure 3:
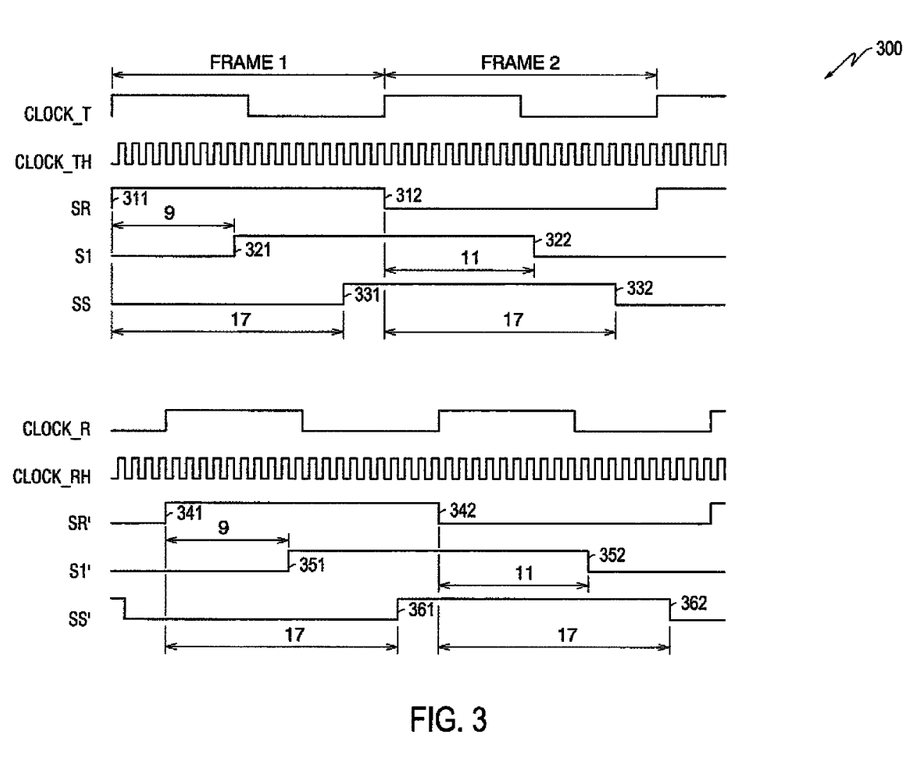
FIG. 3 shows a plot of wave form examples in a communication system according to an embodiment of the disclosure.

FIG. 3 shows a plot 300 of waveform examples based on the communication system 200 according to an embodiment of the disclosure. The plot includes waveforms CLOCK_T, CLOCK_TH, SR, S1 and SS for the transmitter module 210 and waveforms CLOCK. R, CLOCK_RH, SR', S1' and SS' for the receiver module 220.

The waveform CLOCK_T corresponds to the transmitter system clock CLOCK_T. In an embodiment, the data frames are determined based on the transmitter system clock CLOCK_T.

The waveform CLOCK_TH corresponds to the high frequency clock CLOCK_TH. The frequency of the CLOCK_TH is twenty times of the transmitter system clock CLOCK_T. The CLOCK_TH is used by transmitter counters TC1-TCN in the transmitter module 210.

The waveform SR corresponds to the transmitted reference signal SR. The waveform SR includes reference transitions corresponding to starts of multiple-bit data block transmissions. The waveform S1 corresponds to the transmitted data signal S1. The waveform S1 includes data transitions corresponding to multiple-bit data blocks transmitted by the data signal S1. In an embodiment, the data transitions are determined by the transmitting counter TC1. In an example, the transmitting counter TC1 is initialized with 1001 (9) in Frame 1. When the reference signal SR transmits a reference transition 311 in Frame 1, the transmitting counter TC1 starts to down-count in accordance with the high frequency clock CLOCK_TH. When the transmitting counter TC1 down-counts to zero, the data signal 51 transmits a data transition 321. The time difference between the data transition 321 and the reference transition 311 is 9 cycles of the high frequency clock CLOCK_TH. In Frame 2, the transmitting counter TC1 is initialized with 1011 (11). Similarly, the time difference between a reference transition 312 in the reference signal SR, and a data transition 322 in the data signal S1 is 11 cycles of the high frequency clock CLOCK_TH.

The waveform SS corresponds to the transmitted sampling signal SS. The waveform SS includes sample transitions indicating ends of data transmission in the data frames. In an example, each data frame sends a 4-bit data block. The sample counter TCS is initialized with a number larger than a largest 4-bit data block, such as 17, in each data frame. When the reference signal SR transmits the reference transition 311, the sample counter TCS starts to down-count in accordance with the high frequency clock CLOCK_TH. When the sample counter TCS down-counts to zero, the sampling signal SS transmits a sample transition 331. The time difference between the sample transition 331 and the reference transition 311 is 17 cycles of the high frequency clock CLOCK_TH, and is longer than the time needed to transmit the largest 4-bit data block, and can be used to indicate end of data transmission in the data frame. In addition, in an example, the sample transition 331 is used to stop the transmitting counter TC1 and to reload/initialize the transmitting counter TC1 with 1011(11) for Frame 2.

The waveform CLOCK_R corresponds to the receiver system clock CLOCK_R. The receiver system clock CLOCK_R has the same frequency as the transmitter system clock CLOCK_T. It is noted that receiver system clock CLOCK_R does not need to be phase-aligned to the transmitter system clock CLOCK_T.

The waveform CLOCK_RH corresponds to the high frequency clock CLOCK_RH. The frequency of the CLOCK_RH is twenty times of the CLOCK_R. The CLOCK_RH is used by receiver counters RC1-RCN in the receiver module 220.

The waveforms SR', S1' and SS' correspond to the received reference signal SR', received data signal S1' and received sampling signal SS'. The received signals SR', S1' and SS' are delayed from the transmitted signals SR, S1, and SS due to various reasons, such as transmission and link delays, and the like. It is noted that the delays for the different received signals can be substantially the same or can be suitably compensated to be substantially the same.

The waveform SR' includes reference transitions indicating starts of multiple-bit data block receptions in data frames. The waveform S1 includes data transitions indicating ends of multiple-bit data block receptions in the data frames. The data transitions can be suitably used to control the receiving counters to recover the transmitted multiple-bit data blocks. In an example, the receiving counter RC1 is reset to zero. When a reference transition 341 is detected in the received reference signal SR', the receiving counter RC1 is enabled to up-count in accordance to the high frequency clock CLOCK_RH. When a data transition 351 is detected in the received data signal S1', the receiving counter RC1 stops and holds the counted number.

The waveform SS' includes sample transitions indicating ends of data transitions in data frames. The sample transitions can be used to sample the receiving counters RC1-RCN to obtain the received multiple-bit data blocks. For example, when a sample transition 361 is detected in the received sampling signal SS', the output module 227 samples the receiving counter RC1 to obtain 1001. In another example, the sample transition 361 is generated based on the reference transition 341, for example, using the sample counter RCS. Additionally, the sample transitions are used to reset the receiving counters RC1-RCN after sampling.

Figure 4:
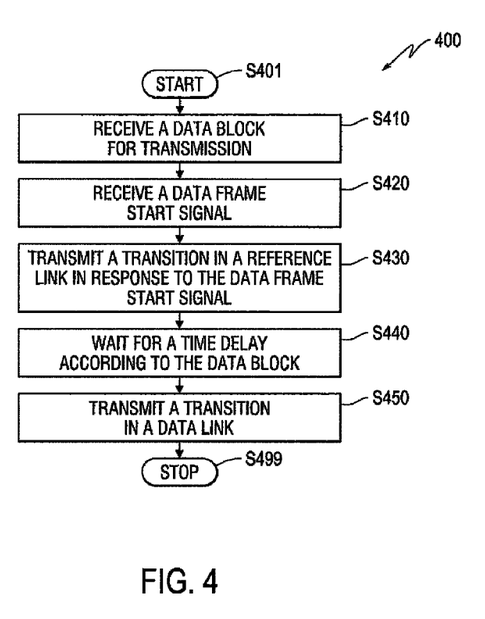
FIG. 4 shows a flow chart outlining a process example of transmitting a digital data block according to an embodiment of the disclosure.

FIG. 4 shows a flow chart outlining a process example 400 for a transmitter module to transmit a data block, such as a 4-bit data block, according to an embodiment of the disclosure. The process starts at S401 and proceeds to S410.

At S410, the transmitter module receives the data block for transmission. In an example, the transmitter module receives 8 bits from a data bus of 8 parallel wires. The transmitter module groups the 8 bits into a first 4-bit data block and a second 4-bit data block. In an embodiment, the transmitter module transmits the first 4-bit data block and the second 4-bit data block in different data frames using a single data link. In another embodiment, the transmitter module transmits the first 4-bit data block and the second 4-bit data block in a same data frame using two data links.

At S420, the transmitter module receives a data frame start signal. In an embodiment, the transmitter module operates based on a system clock. The transmitter module considers leading edges or trailing edges of the system clock as the data frame start signals.

At S430, the transmitter module transmits a reference transition in a reference link in response to the data frame start signal. In an embodiment, the transmitter module flips the logic value on the reference link. More specifically, the transmitter module transmits a positive transition from a low voltage to a high voltage when the present voltage on the reference link is low, and transmits a negative transition from a high voltage to a low voltage when the present voltage on the reference link is high. Thus, the reference link has one transition in each data frame.

At S440, the transmitter module waits for a time delay based on the data block for transmission. In an embodiment, the transmitter module uses a counter to count a number of clock cycles based on the data block for transmission.

At S450, the transmitter module transmits a data transition in a data link. Thus, the time difference between the data transition in the data link and the reference transition in the reference link corresponds to the transmitted data block. In an embodiment, the transmitter module transmits the data transition by flipping the logic value on the data link. More specifically, the transmitter module transmits a positive transition from a low voltage to a high voltage when the present voltage on the data link is low, and transmits a negative transition from a high voltage to a low voltage when the present voltage on the data link is high. Thus, the data link has one transition in each data frame. Then, the process proceeds to S499 and terminates.

It is noted that the transmitter module can include multiple data links to transmit multiple data blocks in parallel. Each of the multiple data links transmits a data transition with regard to the reference transition in the reference link. Thus, to transmit N data blocks, the transmitter module uses N+1 transitions. Thus, the transmitter module transmits a large number of bits with a reduced number of transitions, and reduces, for example, dynamic power consumption.

Figure 5:
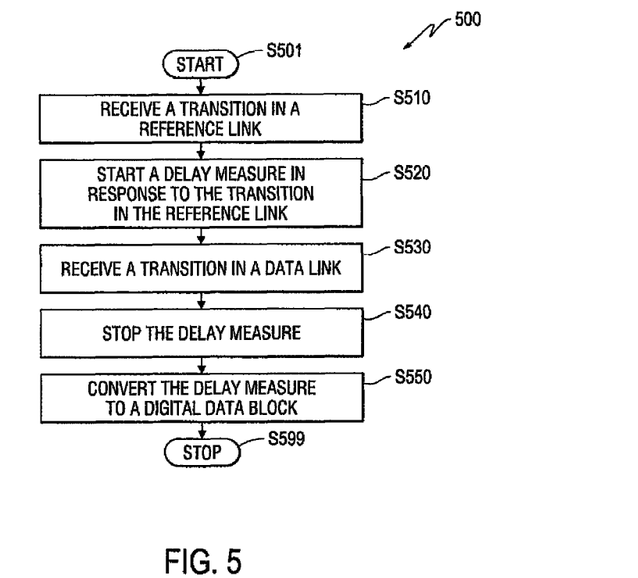
FIG. 5 shows a flow chart outlining a process example of receiving a digital data block according to an embodiment of the disclosure.

FIG. 5 shows a flow chart outlining a process example 500 for a receiver module to receive a data block according to an embodiment of the disclosure. The data block is transmitted by a transmitter in the form of a time delay between a data transition in a data link and a reference transition in a reference link. The process starts at S501 and proceeds to S510.

At S510, the receiver module detects the reference transition in the reference link. In an embodiment, the reference transition can be a positive transition or a negative transition.

At S520, the receiver module starts a delay measure in response to the reference transition in the reference link. In an embodiment, the receiver module starts a counter to count in accordance with a high frequency clock. The high frequency clock has the same frequency as a clock in the transmitter module. The transmitter module transmits the data transition with regard to the reference transition based on the clock.

At S530, the receiver module detects the data transition in the data link. In an embodiment, the transition can be a positive transition or a negative transition.

At S540, the receiver module stops the delay measure in response to the detected data transition.

At S550, the receiver module converts the delay measure to a data block. The process proceeds to S599 and terminates.

Figure 6:
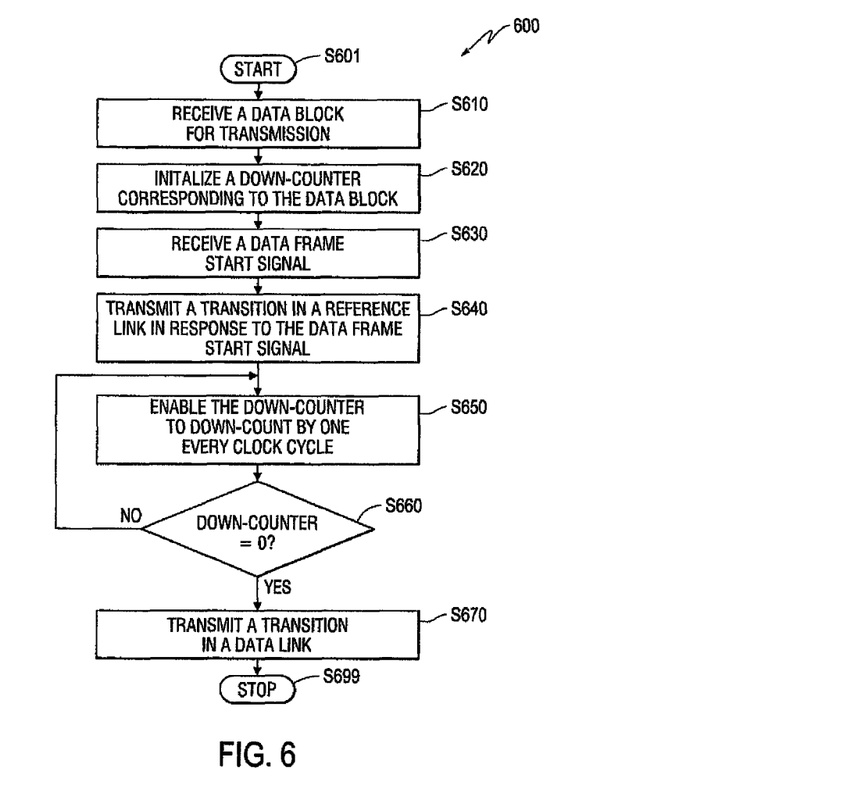
FIG. 6 shows a flow chart outlining another process example of transmitting a digital data block according to an embodiment of the disclosure.

FIG. 6 shows a flow chart outlining another process example 600 for a transmitter module to transmit a multiple-bit data block, such as a 4-bit data block, for example, according to an embodiment of the disclosure. The process starts from S601 and proceeds to S610.

At S610, the transmitter module in the example receives the 4-bit data block for transmission.

At S620, the transmitter module initializes a down-counter based on the received 4-bit data block.

At S630, the transmitter module receives a data frame start signal. In an embodiment, the transmitter module operates based on a system clock. The transmitter module considers leading edges or trailing edges of the system clock as the data frame start signals.

At S640, the transmitter module transmits a reference transition in a reference link in response to the data frame start signal. In an embodiment, the transmitter module flips the logic value on the reference link. More specifically, the transmitter module transmits a positive transition from a low voltage to a high voltage when the present voltage on the reference link is low, and transmits a negative transition from a high voltage to a low voltage when the present voltage on the reference link is high. Thus, the reference link has one transition in each data frame.

At S650, the transmitter module enables the down-counter to down-count based on a high frequency clock. The high frequency clock can be generated based on the system clock. In an example, the transmitter module transmits a 4-bit data block in each system clock cycle. Then, the high frequency clock can be generated by frequency-multiplying the system clock, for example, of twenty times.

At S660, the transmitter module determines whether the down counter is zero. When the down counter is zero, the process proceeds to S670; otherwise, the process returns S650.

At S670, the transmitter module transmits a data transition in a data link. The process proceeds to S699 and terminates.

Figure 7:
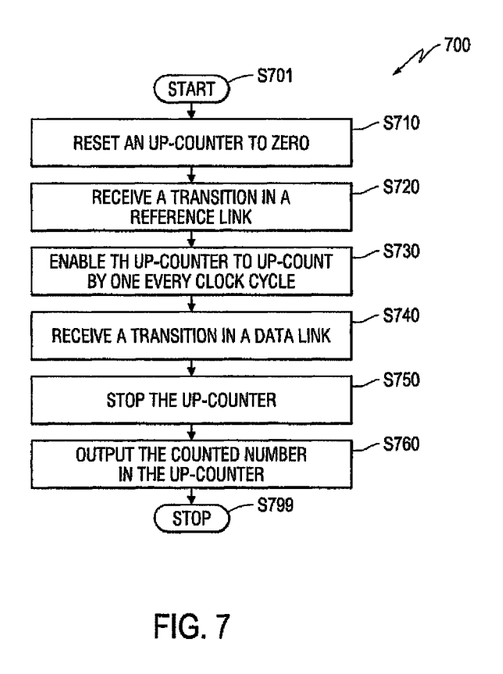
FIG. 7 shows a flow chart outlining another process example of receiving a digital data block according to an embodiment of the disclosure.

FIG. 7 shows a flow chart outlining another process example for a receiver module to receive a multiple-bit data block according to an embodiment of the disclosure. The data block is transmitted by a transmitter in the form of a time delay between a data transition in a data link and a reference transition in a reference link. It is noted that the transmitter module determines the time delay for data transition with regard to the reference transition based on a high frequency clock. The receiver module also has a high frequency clock having the same frequency as the high frequency clock in the transmitter module. The process starts from S701, and proceeds to S710.

At S710, the receiver module resets an up-counter to zero.

At S720, the receiver module receives the reference transition in the reference link.

At S730, the receiver module enables the up-counter to up-count by one every clock cycle in accordance to the high frequency clock.

At S740, the receiver module receives the data transition in the data link.

At S750, the receiver module stops the up-counter in response to the data transition.

At S760, the receiver module outputs the counted number in the up-counter. In an embodiment, the receiver module receives a sample transition in a sample link from the transmitter. The receiver module samples the up-counter when the sample transition is received.

In another embodiment, the receiver module includes sample counter. The sample counter starts counting in accordance to the high frequency clock when the reference transition is received. When the counted number by the sample counter is larger than a threshold, such as 17 for 4-bit data block transmission, the receiver module samples the up-counter to obtain the transmitted data block. The process proceeds to S799 and terminates.

It is noted that some steps in processes 400, 500, 600 and 700 can be performed in parallel or in a different order. In an example, a receiver module can perform S710 after S720 in a same clock cycle.

While the disclosure describes that corresponding clocks in the transmitter module and the receiver module are of the same frequency, the frequencies of the corresponding clocks can be different due to, for example, manufacturing variations, environmental variations, measurement variations, and the like.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for signaling, comprising:
    transmitting a reference transition that indicates a beginning of a first multiple-bit data block transmission of multiple-bit data block transmissions from a transmitter module to a receiver module;
    initializing a first counter to the first multiple-bit data block;
    starting the first counter upon transmitting the reference transition to count by one for every clock cycle of a first clock of the transmitter module, the first clock having a same frequency as a second clock in the receiver module;
    transmitting a first data transition that indicates an ending of the first multiple-bit data block transmission from the transmitter module to the receiver module when a counted number by the first counter corresponds to a time difference between the reference transition and the first data transition and the first counter down-counts to zero.

2. The method of claim 1, further comprising:
    generating the first clock of the transmitter module by frequency-multiplying a system clock of the transmitter module.

3. The method of claim 1, further comprising:
    starting a second counter to count in accordance with the first clock of the transmitter module; and
    transmitting a second data transition in corresponding to transmitting a second multiple-bit data block from the transmitter module to the receiver module when a counted number by the second counter corresponds to the second multiple-bit data block.

4. The method of claim 1, wherein the transmitting the reference transition is over a first link and the transmitting the first data transition is over a second link that is different from the first link.

5. An apparatus comprising:
    a reference transmitting module configured to transmit a reference transition that indicates a beginning of a first multiple-bit data block transmission of multiple-bit data block transmissions to a receiving apparatus;
    a first counter configured to be initialized to the first multiple-bit data block, count by one for every clock cycle of a first clock of the apparatus, and start counting upon transmitting the reference transition in accordance with the first clock of the apparatus when the reference transition is transmitted, the first clock having a same frequency as a second clock in the receiving apparatus; and
    a first data transmitting module configured to transmit a first data transition that indicates an ending of the first multiple-bit data block transmission to the receiving apparatus when a counted number by the first counter corresponds to a time difference between the reference transition and the first data transition and the first counter down-counts to zero.

6. The apparatus of claim 5, further comprising:
    a clock generator configured to generate the first clock by frequency-multiplying a system clock of the apparatus.

7. The apparatus of claim 5, further comprising:
    a second counter configured to start counting in accordance to the first clock of the apparatus; and
    a second data transmitting module configured to transmit a second data transition corresponding to transmitting a second multiple-bit data block to the receiving apparatus when a counted number by the second counter corresponds to the second multiple-bit data block.

8. The apparatus of claim 5, wherein the reference transmitting module transmits the reference transition over a first link and the first data transmitting module transmits the first data transition over a second link that is different from the first link.

9. An integrated circuit (IC), comprising:
    a transmitter module configured to transmit multiple-bit data blocks based on a transmitter clock; and
    a receiver module configured to receive the multiple-bit data blocks based on a receiver clock, the transmitter clock and the receiver clock having a same frequency, wherein the transmitter module comprises:
- a reference transmitting module configured to transmit a reference transition that indicates a beginning of a first multiple-bit data block transmission of multiple-bit data block transmissions from the transmitter module to the receiver module;
- a first transmitting counter configured to start counting by one for every clock cycle of the transmitter clock when the reference transition is transmitted; and
- a first data transmitting module configured to transmit a first data transition that indicates an ending of the first multiple-bit data block transmission from the transmitter module to the receiver module when a counted number by the first transmitting counter corresponds to a time difference between the reference transition and the first data transition; and the receiver module comprises:
- a reference receiving module configured to receive the reference transition to start receptions of multiple-bit data blocks transmitted from the transmitter module;
- a first data receiving module configured to receive the first data transition corresponding to the first multiple-bit data block transmitted from the transmitter module; and
- a first receiving counter configured to start counting by one for every clock cycle of the receiver clock when the reference receiving module receives the reference transition and stop counting when the first data receiving module receives the first data transition.

10. The IC of claim 9, wherein the first transmitting counter is initialized to the first multiple-bit data block and is configured to count in accordance with the transmitter clock.

11. The IC of claim 10, wherein the first data transmitting module is configured to transmit the first data transition when the first transmitting counter down-counts to zero.

12. The IC of claim 9, wherein the first receiving counter is initialized to zero and is configured to count in accordance with the receiver clock.

13. The IC of claim 9, wherein
the transmitter module further comprises:
- a second transmitting counter configured to start counting in accordance to the transmitter clock when the reference transition is transmitted; and
- a second data transmitting module is configured to transmit a second data transition corresponding to transmitting a second multiple-bit data block to the receiver module when a counted number by the second transmitting counter corresponds to the second multiple-bit data block; and the receiver module further comprises:
- a second data receiving module configured to receive the second data transition corresponding to the second multiple-bit data block transmitted from the transmitter module; and
- a second receiving counter configured to start counting in accordance with the receiver clock when the reference receiving module receives the reference transition and stop counting when the second data receiving module receives the second data transition.

14. The IC of claim 9, wherein
the transmitter module further comprises:
- a sample transmitting counter configured to start counting in accordance to the transmitter clock when the reference transition is transmitted; and
- a sample transmitting module configured to transmit a sample transition in when a counted number by the sample transmitting counter is larger than a largest multiple-bit data block; and the receiver module further comprises:
- a sample receiving module configured to receive the sample transition; and
- an output module configured to sample the first receiving counter to obtain the first multiple-bit data block when the sample transition is received.

15. The IC of claim 9, wherein
the receiver module further comprises:
- a sample receiving counter configured to start counting in accordance with the receiver clock when the reference receiving module receives the reference transition; and
- an output module configured to sample the first receiving counter to obtain the first multiple-bit data block when the sample receiving counter counts a number larger than a larger multiple-bit data block.

16. The IC of claim 9, further comprising:
- a first phase-locked-loop (PLL) configured to generate the transmitter clock by frequency-multiplying a system clock; and
- a second PLL configured to generate the receiver clock by frequency-multiplying the system clock.

17. The IC of claim 9, wherein the transmitter module and the receiver module are within a same IC chic or within different chips.

18. The IC of claim 9, wherein at least one of the first transmitting counter and the first receiving counter is a ripple counter.

* * * * *